Aug. 26, 1924.
M. KIEFER
BELT FASTENER
Filed April 12, 1923
1,506,489
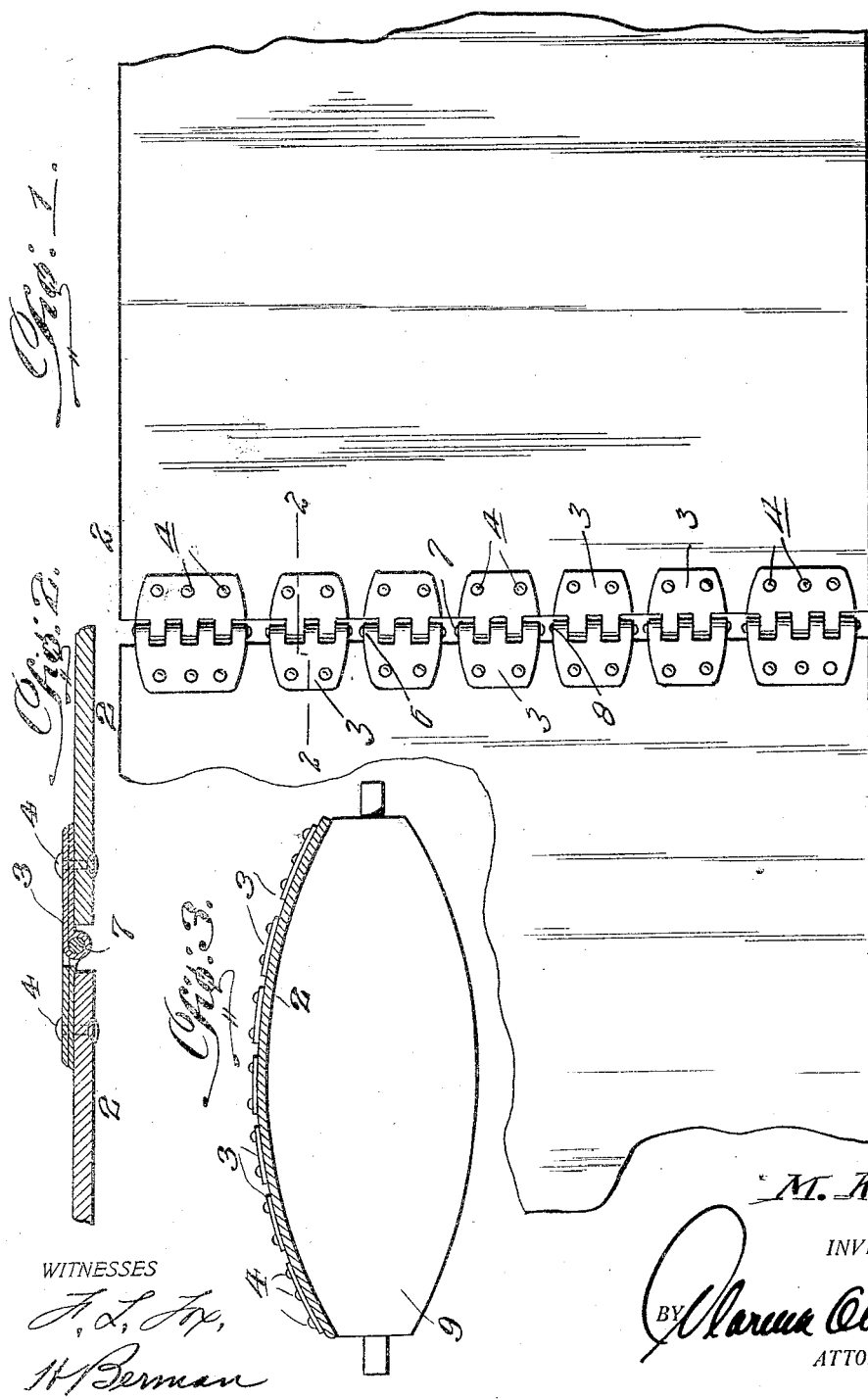

Patented Aug. 26, 1924.

1,506,489

UNITED STATES PATENT OFFICE.

MARTIN KIEFER, OF ELMHURST, ILLINOIS.

BELT FASTENER.

Application filed April 12, 1923. Serial No. 631,518.

*To all whom it may concern:*

Be it known that MARTIN KIEFER, a citizen of the United States, residing at Elmhurst, in the county of Du Page and State of Illinois, has invented certain new and useful Improvements in Belt Fasteners, of which the following is a specification.

This invention relates to belt fasteners and more particularly to a belt fastener wherein the ends of the belt are connected by a plurality of hinged members.

An object of the invention resides in providing a connection for the ends of a belt including a plurality of hingedly connected sections of equal size adapted to be placed intermediate the side edges of the belt with corresponding sections connected to corresponding ends of the belt, the pivots of said hinged sections being arranged in axial alignment, and hinged sections for the ends of the belt adjacent the outer edges thereof having an increased suction with relation to remaining hinged connections, the pivots of which are in axial alignment with the above mentioned hinged members for compensating and receiving the increased stresses at the side edges of said belt.

The improved belt fastener or lacing is particularly adapted to hold up for any length of time and is adapted to pulleys and rollers connected by pivots over which it will pass and fold many times without coming apart and so causing the releasing of the pin which is liable to catch and come out, necessarily allowing the end of the belt to also catch. This last contingency has the effect of ruining the whole belt but in accordance with the invention the hinge will give when passing over the rollers without breaking.

If the belt must be shortened all that is to be done is to cut the rivets or flat headed bolts, whichever is going to be used and cut the bolt and inset hinges. However, the hinges and bolts cannot wear rapidly and both the hinges and pins connecting them may be made as strong as needed.

The invention will be best understood from a consideration of the following detailed description taken in connection with the accompanying drawings forming part of this specification with the understanding, however, that the invention is not confined to any strict conformity with the showing in the drawings but may be changed and modified so long as such changes and modifications mark no material departure from the salient features of the invention as expressed in the appended claim.

In the drawings:

Figure 1 is a plan view of a belt coupling constructed in accordance with the invention;

Figure 2 is a section on the line 2—2 of Figure 1; and

Figure 3 is a section through the belt coupling lengthwise of the showing of Figure 2.

Referring to the drawings, there is shown two adjacent ends 1 and 2 of a power conveying belt connected by a transverse series of hinges 3, each connected to the respective end of the belt by rivets 4 with the respective belt connections provided with eyes 6 in interlocking relation with the eyes traversed by pins 7 having the ends of the rivets headed as shown at 8 whereby the ends of the belt may be pivotally connected and riveted without danger of the connected ends of the belt pulling apart and the ends of the belt connected together by the pins 7 to hold the belt in lengthwise connection. Moreover, the elements of the connections are permanently fixed to the adjacent ends of the belt by the rivets 4 so that the connected ends of the belt may be disconnected by driving out the rivets 4 and reconnecting the belt sections by introducing new rivets 4 or the two sections of the belt may be connected by driving out the pins 7 and getting the same results.

The plurality of hinged members 3 connecting the belt ends intermediate the edges thereof are arranged in close relation and are of an equal size, while the end plates adjacent the edges of the belt are provided with increased connecting sections adapted to withstand the increased stresses at the side edges of the belt.

The belt is caused to travel over conical pulleys 9 shown in Figure 3 with the hinges 3 also shown in the same figure. The rivets or links connecting the hinge sections of the belt together are all metal and afford superior strength, adapting the connected belt to resist breakage when in service and one which will operate under disadvantage under adverse circumstances.

What is claimed is:

A belt fastener including a plurality of hinged members connected with opposite ends of the belt for securing said ends together, the hinged connections of said members being arranged in axial alignment, the hinged members connecting said belt intermediate the side edges being of uniform size and the end hinge members adjacent the side edges of the belt having increased connecting sections adapted to receive the increased stresses at the side edges of the belt.

In testimony whereof I affix my signature.

MARTIN KIEFER.